Patented June 1, 1937

2,082,525

UNITED STATES PATENT OFFICE 2,082,525

ANTIOXIDANTS

Arthur W. Sloan, Akron, Ohio, assignor to The B. F. Goodrich Company, New York, N. Y., a corporation of New York No Drawing. Application May 26, 1933, Serial No. 673,118

4 Claims. (Cl. 18—50)

This invention relates to the art of preserving rubber, fatty oils, petroleum products, synthetic plastics, and like organic materials against unduly rapid deterioration due to oxidation and the like.

This invention, in brief, consists in treating the rubber or other like organic material with a member of a class of aromatic amines which contain at least three primary amino groups attached to an aromatic nucleus, at least two of the amino groups being attached to the same aromatic ring. The aromatic nucleus may consist of a single aromatic ring or a plurality of rings, either conjugated or simply connected directly or through carbon atoms, nitrogen atoms, oxygen atoms, sulphur atoms and the like.

For example, the following compounds are typical members of the class of anti-oxidants described above: 1,3,5 triamino benzene; tetra-amino benzene, hexa-amino benzene; 2,4,6 triamino toluene; tetra-amino naphthalene; tetra-amino anthracene; 2,4,6 triamino biphenyl; 2,4,4' triamino biphenyl; 2,4,2',4' tetra-amino biphenyl; 2,4,6,4' tetra-amino biphenyl; 2,4,6,2',4',6' hexa-amino biphenyl; 2,4,2',4' tetra-amino 5,5' dimethyl biphenyl; 2,4,6 triamino diphenylmethane; 2,4,2',4' tetra-amino diphenylmethane; 2,4,2',4' tetra-amino 5,5' dimethyl diphenyl methane; 2,4,2',4' tetra–amino diphenyl dimethyl methane; tetra-amino dinaphthyl methane; 2,4,2',4' tetra-amino diphenyl oxide; 2,4,4' triamino diphenylamine; 2,4,2',4' tetra-amino diphenylamine; 3,5,3',5' tetra-amino diphenylamine; etc. Any of the above-enumerated compounds may be used with good effect to retard the deterioration of rubber and other like organic substances, preferably in moderately small proportions, say from 0.1 to 5 per cent. They are particularly useful in preventing rubber which is exposed to high temperatures from becoming soft and tacky.

As a specific example of one embodiment of the invention of this application, a rubber composition is prepared containing blended plantation rubber 100 parts by weight, sulphur 5.5 parts, zinc oxide 30 parts, gas black 40 parts, mineral rubber 10 parts, palm oil 5 parts, and hexamethylene tetramine 0.75 part. One portion of this composition is used as a control, while another portion is further mixed with 0.96 part by weight (0.5% of the composition) of 2,4,2',4' tetra-amino 5,5' dimethyl diphenyl methane. After vulcanization in a press for 45 minutes at 294° F. to produce an optimum cure, it is found that the composition containing the antioxidant deteriorates only approximately one-half as fast as the control composition when subjected to an accelerated aging test such as the Geer oven test.

It is to be understood that the term "treating" is employed in the appended claims in a generic sense to include either the incorporation of the anti-oxidants into the rubber or the like by mixing them into the said material while it is in a plastic or fluid condition, or by applying them to the surface of a solid mass thereof as a paste, powder or solution. The term "rubber" is likewise employed in the claims in a generic sense to include caoutchouc, both natural and synthetic, balata, gutta percha, rubber isomers and like products, whether or not admixed with fillers, pigments, or vulcanizing or accelerating agents.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

This application is a continuation in part of my co-pending application Serial No. 301,423 filed August 22, 1928.

I claim:

1. The method of preserving rubber which comprises treating rubber with 2,4,2',4' tetra-amino 5,5' dimethyl diphenyl methane.

2. A composition comprising rubber and 2,4,2',4' tetra-amino 5,5' dimethyl diphenyl methane.

3. The method of preserving rubber which comprises treating rubber with a tetra-amino diaryl alkane.

4. A composition comprising rubber and a tetra-amino diaryl alkane.

ARTHUR W. SLOAN.